United States Patent [19]

Schneider

[11] 3,798,367

[45] Mar. 19, 1974

[54] APPARATUS FOR ELIMINATION OF INTERFERENCE FROM VIDEO SIGNALS

[75] Inventor: Adolf Schneider, Munich, Germany

[73] Assignee: Siemens Aktiengesellschaft, Berlin and Munich, Germany

[22] Filed: Oct. 14, 1971

[21] Appl. No.: 189,318

[30] Foreign Application Priority Data

Oct. 23, 1970 Germany .......... 2052290
Jan. 26, 1971 Germany .......... 2103585

[52] U.S. Cl. .......... 178/7.2, 178/DIG. 29
[51] Int. Cl. .......... H04n 5/21
[58] Field of Search .......... 178/7.2, 7.1, DIG. 12, 178/16, 25, 29; 325/475, 476

[56] References Cited

UNITED STATES PATENTS

| | | | |
|---|---|---|---|
| 3,265,812 | 8/1966 | Essinger et al. | 178/7.2 |
| 3,437,749 | 4/1969 | Klem | 178/DIG. 29 X |
| 3,495,035 | 2/1970 | Ando | 178/DIG. 29 X |

*Primary Examiner*—Benedict V. Safourek

[57] ABSTRACT

Apparatus is described for eliminating interferences in the video signals in video telephony or in other applications where the image receiving tube at the transmitter has a short storage time. A filter circuit is described for accomplishing the elimination of such interference, and this filter circuit is preferably placed at the transmission end of the video telephone circuit. The filter basically comprises a series arrangement of a logarithmic amplifier, a band elimination filter tuned to double the power frequency, a limiter and a potentiometer. The video signal is clamped to the black level prior to being coupled to the aforementioned filter arrangement. After the signal has been so filtered, the necessary picture gating, line gating and synchronizing signals may be added, as necessary. Other arrangements are described in which the interference frequency is branched off from the main circuit to be mixed with the disturbed video signal. This branching may be accomplished either electrically or optically.

10 Claims, 22 Drawing Figures

APPARATUS FOR ELIMINATION OF INTERFERENCE FROM VIDEO SIGNALS

BACKGROUND OF THE INVENTION:

The invention relates to circuitry for use with video telephones for eliminating interference on the screen, which originates in the difference between the frame frequency and the power frequency present in the area where the video telephone camera is placed. The latter difference becomes a particularly acute problem when the two frequencies have no whole-numbered relationship.

For the video telephone, just as with commercial television, a frame frequency corresponding to half the power frequency is used, as a rule. In the United States the Federal Communications Commission requires a frame frequency of 30 Hz. The standard European frame frequency is 25 Hz, with a power frequency of 50 Hz. The invention will be described in the context of these parameters, but the principles of the invention are equally applicable to any set of frequencies. If one desires to reduce the picture and line flicker with greater picture brightness, it is appropriate to switch to a greater frame frequency, e.g., to 30 Hz, which corresponds to 60 half pictures or fields per second with interlaced scanning.

With artificial illumination of the room at the site of the video telephone, in particular with fluorescent lights, there are difficulties. Namely, the lighting fixtures are in effect switched off and then on again with each crossover of the lighting circuit frequency of 50 Hz, or 100 times per second. These fluctuations in brightness are not perceived by the human eye, or only minimally, but are perceived by the vidicon tubes or the like in the video telephone camera. Thereby, an undesired modulation becomes noticeable on the screen, which is manifested as a local brightness fluctuation (flickering) with a frequency of 20 Hz, or as a running through of brightness minima or maxima in the direction of scanning (from top to bottom) with a frequency of 10 Hz. A similar modulation is, to be sure, also present with a frame frequency of 25 Hz; but it does not interfere, because it remains in phase with the picture frequency and thus does not pass over the picture.

It is known that to eliminate the cause of this modulation, the fluorescent lights of the room in which the video telephone is set up are sub-divided into three groups and each group is connected to a different phase of a three-phase system. Such a measure is expensive and therefore seldom used.

In order to eliminate the interference effect in the video signal it is also possible to direct the video signal modulated by the fluctuations in the room's illumination, e.g., with 100 Hz, over a simple band-elimination filter which is tuned to the interference frequency. However, since this light interference has elicited a genuine amplitude modulation, this is difficult to suppress by simple filtering.

An object of the invention is to provide a means for eliminating the interfering brightness fluctuations which stem from the frame frequency deviating from the power frequency.

SUMMARY OF THE INVENTION:

The invention suggests that the interferences be eliminated with a circuit arrangement in accordance with which on the transmission end of each video telephone there is attached a filter circuit comprising a series connection of a logarithmic amplifier, a band elimination filter tuned to double the power frequency, a limiter, and an exponential amplifier for taking the antilogarithm of the signal. The video signal is taken from across circuit, which serves to clamp it and is coupled to the filter. At the output of the filter circuit, the further signals necessary for the reproduction of the picture, e.g., the picture gating, line gating, and synchronous pulses are combined in an adder.

The fact that the picture signal is refined in a series of devices assures that the interference frequency is fully filtered out and is not present in the output signal of the filtering circuit. When, in accordance with the invention, the gating and synchronous pulses which cannot be influenced by the room's illumination are added, as discussed above, then an otherwise necessary circuit expense for the elimination of the interference from these pulses disappears also.

In accordance with a further extension of the invention, the filtering circuit contains additionally a subtracting element, in which the picture signals tapped off behind the logarithmic element and behind the band elimination filter are compared with each other, and a preferably electronic switch, which switches the filter circuit to inoperative when there is a greater amplitude at the output of the subtracting element than expected with the interference frequency. This has the advantage that the signals held in the meantime in the picture, which were picked up by specific movements of the camera, remain and are not suppressed simultaneously with the interference frequency.

This circuit arrangement requires a very selective band filter (band elimination filter), in order to keep the undesired distortions of the frame frequency impulses arising through the switching processes at a low level. Since the actual picture signal is directed over the band elimination filter with a large band width of, for example, 1 MHz, and since it must pass therethrough unaffected, increased demands are made, when the filter is made with operational amplifiers, on the transmission response of such amplifiers. An extension of the invention suggests, therefore, that this circuit arrangement be modified such that, instead of the band elimination filter, a band filter (band pass) is provided, which only passes the interference frequency (100 Hz). A phase reversing amplifier and an addition element are added in between the band filter and the potentiometer, and the band filter and the phase reversing amplifier are bridged by a parallel path, over which the picture signal present at the output of the logarithmic element arrives at the summing element simultaneously with the double light frequency (interference frequency 100 Hz) recovered in the band filter and reformed in the phase reversing amplifier. This has the additional advantage that the video signal arrives at the output of this circuit arrangement on the shortest path, while by-passing the band filter and several other apparatuses of the filtering circuit. The devices for recovery of the signals compensating the interference frequency are in a parallel branch, so that they do not affect the picture signal.

The logarithmic element at the input and the exponential amplifier at the output of the filtering circuit can also be left out, in accordance with a further version of the invention. In this way, two further switching elements, through which the video signal could be impaired, given as inexact setting, are switched out.

In accordance with another version of the invention, the application of the pure interference frequency recovered in the parallel path to the interrupted picture signal of the direct path can take place also in a divider. This has the advantage, that three switching elements, namely, the logarithmic element, the summing element, and the potentiometer are replaced with a single element; namely, a divider. Thereby, the advantage is achieved, in addition to a simplification of the whole arrangement, that distortions of the video signal, possible through the successive taking of logarithms and antilogarithms, are avoided, and that the circuit arrangement is less sensitive to tolerance deviations.

In accordance with a further version of the invention, the disturbed picture signal is taken from an output of a limiter arranged after the divider for the recovery of the pure interference frequency and used according to the size of the interference to regulate the amplitude of the pure interference frequency in the divider which is to be mixed. This has the advantage that with this arrangement no sort of amplitude adjustment of the pure interference frequency to be mixed is necessary, because this amplitude adjusts itself automatically on the basis of the interference frequency still present in the video signal at the output of the circuit arrangement.

In accordance with another version of the invention, the pure interference frequency is taken directly from the power circuit, and the interference recovered in the parallel path serves only to control the amplitude of the pure interference frequency to be mixed. The advantage results that no stringent demands must be made on the phase constancy of the band filter tuned to the interference frequency.

BRIEF DESCRIPTION OF THE DRAWINGS:

The principles of the invention will be best understood by reference to the detailed description of preferred embodiments of the invention given hereinbelow in conjunction with the drawings in which:

FIGS. 6a - i are waveform diagrams of signals appearing at various points in the FIG. 5 embodiment;

DETAILED DESCRIPTION OF THE DRAWINGS:

The preferred embodiments of the invention described hereinbelow are illustrated by means of block diagrams. The descriptive terms applied to each block refer to circuit elements which are well known and a part of the prior art. Prior art circuits, connected as described hereinbelow, may be used to perform the functions ascribed to the various blocks. Therefore, detailed descriptions of the contents of the various blocks are not given herein.

Figure 1:
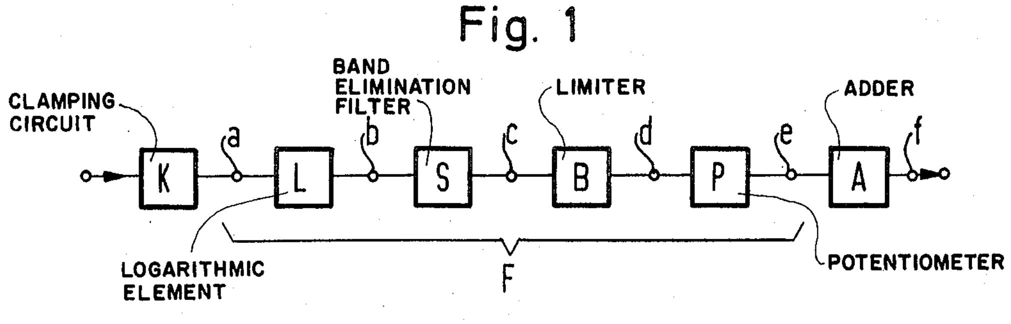
FIG. 1 is a block schematic diagram of a preferred embodiment of a video signal filter for use at the transmitter in video telephony.

The filter circuit F comprises, in accordance with FIG. 1, a series connection of a logarithmic element L, a band-elimination filter S, a limiter B and an exponential amplifier P. A clamping circuit K is placed, in addition, in front of and an adder A is placed behind the filter circuit. How the picture signal is reconstituted by the sequence of the individual elements of the circuit, and how it appears in accordance therewith at the points a to *f*, is shown in FIG. 2 in the curves denoted with the same letters.

It is assumed for this description, that the frequency of the power or lighting circuit is 50 Hz and that the video telephone picks up, transmits, and reproduces on the screen a half-picture 60 times per second. Corresponding thereto, the light interference frequency is 100 Hz, to which the band elimination filter S is tuned.

With other power frequencies, the band elimination filter is to be proportioned accordingly, e.g., for 120 Hz with a 60 Hz power frequency.

The filter circuit F is placed preferably at the transmitter because, at this location, the picture signal is available before the mixing, therewith, of the gating and synchronous pulses, and because the interferences appearing in the transmission path are not yet present. In the input of the filter circuit F the clamping circuit K in the known manner provides for the fact that the picture signals are clamped to the synchronous ground, i.e., the black value. This termination, from across which the video signal is taken, is necessary, so that the following limiting can be undertaken at a precisely defined point.

Figure 2A:
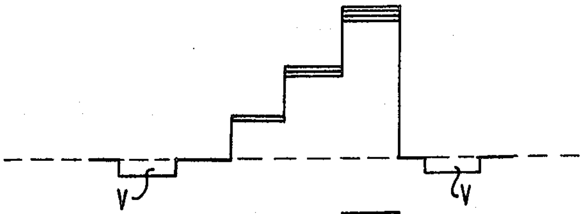
FIGS. 2*a* –*f* illustrate the waveforms occurring at various points in the FIG. 1 circuit.

At the output of the clamping circuit, a line picture signal is present, for example, as shown in FIG. 2*a*. The curve is composed of several picture signals taken from the same line, whereby, however, the subject of the picture is exposed to an illumination fluctuation caused by the power frequency. Whereas, the black value (see FIG. 3) is picked up as a sharp straight line, the gray values and the white value consist of several superimposed lines. Corresponding to the characteristic line of the image reception tube the distances between the separate lines of the respective picture amplitude are proportional.

In order to make this differential fluctuation independent of the respective content of the picture, the logarithm of the picture signal is derived in the succeeding element L. Therefrom, a curve arises according to FIG. 2*b*. As may be recognized, the distances between the separate lines, which correspond to a specific gray value, are always the same in the logarithmic curve. However, the signal still has experienced a distortion of the amplitudes of the separate gray values with this reformulation, which, however, are removed again in the exponential amplifier P, when the antilogarithm of the signal is derived.

Figure 2B:
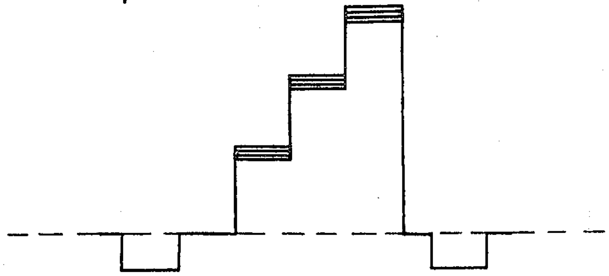
Figure 2C:
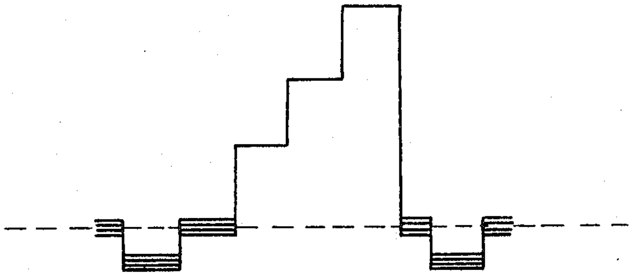

From the logarithmic amplifier L, the video signal arrives in the band elimination filter S, which, as already described, is tuned to 100 Hz. As shown in FIG. 2*c*, the interference frequency of 100 Hz now no longer appears on the pulse peaks but on the pulse. The interference frequency is thereby phase shifted by 180°. A similar shifting of this type appears with all gray stages, since the 100 Hz-fluctuation of the light is equally large for every picture amplitude.

A limiter B is connected to the output of the band elimination filter S. Since the picture signal is now interference-free in various gray stages according to FIG. 2*c*, and the 100 Hz-modulation is present still only with the black value level s (dashed line), as well as with the line gating gaps v appearing under this level, the picture signal is limited beneath a value somewhat above the black value level.

Figure 3:
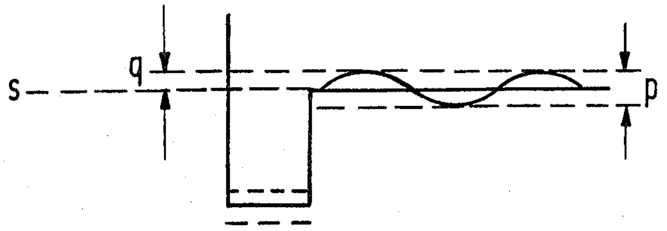
FIG. 3 is an enlarged portion of the output waveform from a limiter in the FIG. 1 embodiment.
Figure 2D:
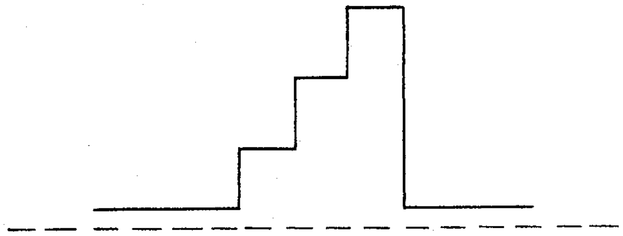

FIG. 3 shows at which place the limiter threshold must lie. The interference frequency 100 Hz fluctuates by a value $2q = p$ around the black value level. The threshold of the limiter B, beneath which all signals are suppressed, must consequently lie above the black value level s slightly more than around the quantity $q$. That the line gating gap v is also suppressed with this limiting is unimportant, since this gating gap is again added to the picture signal in the adder A. In this manner a signal arises, which is shown in FIG. 2*d*.

Figure 2E:
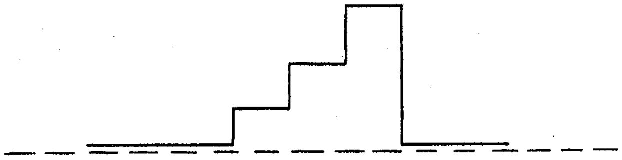
Figure 2F:
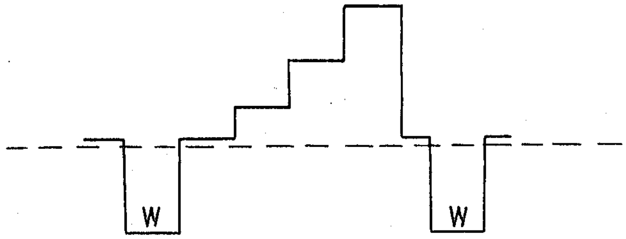

Thereupon, as already described, antilogarithm of the video signal is again derived and therewith the gray values are brought into a correct relationship with each other. As can be seen in FIG. 2*e*, the darkest gray tone is not equal to the original black value. This loss of information, which in most cases could be under 5 percent, is in this case, so small that it can be ignored.

Finally, the picture gating—, line gating, and synchronous pulses w are added to the picture signal in the adder A, so that now an interference-free video signal prepared for transmission results.

In case the interference frequency itself, with which the video signal is modulated, is not a sinusoidal oscillation, but contains harmonics, as is particularly the case with fluorescent lamp light, then whole side bands of harmonics of the line frequency appear. In general, however, the basic frequency of 100 Hz constitutes the overwhelmingly predominant portion in the spectrum of the brightness fluctuations, so that the described circuit suffices to eliminate this basic frequency component.

Since with certain movements 100 Hz portions can appear in the picture signal as harmonics also, they would also be suppressed by the circuit according to FIG. 1, and the signal would not be distorted. As long as these genuine 100 Hz portions are not larger in their amplitude than the light modulation portions, the filtering is hardly noticeable. With larger amplitude, for example, with two black-white bars, which move across the picture vertically in the direction of scanning, it is appropriate to switch out the filter circuit F for the duration such a picture content.

Figure 4:
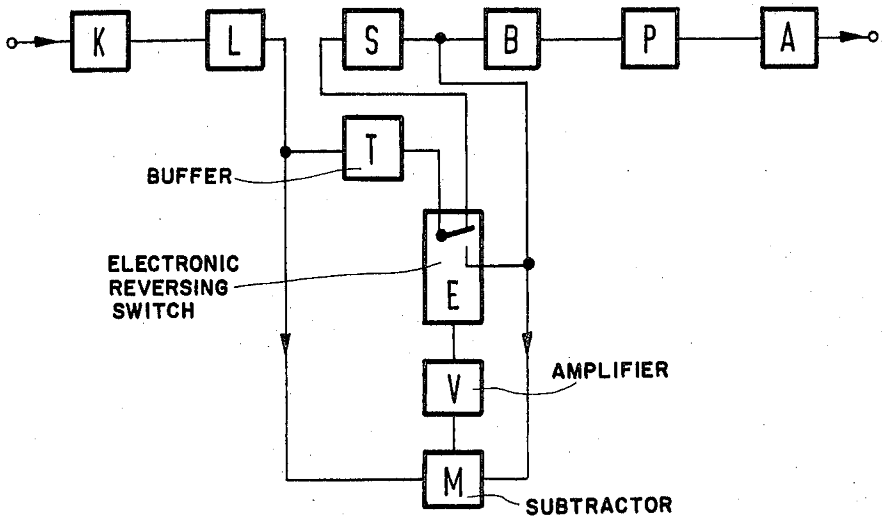
FIG. 4 is a block schematic diagram of a first alternative configuration to the FIG. 1 embodiment.

This is achieved with the circuit of FIG. 4. For this purpose, the picture signal FIG. 2*b* is tapped off behind the logarithmic element L and the picture signal FIG. 2*c* is tapped off after the band elimination filters S, and directed to a subtraction element M. There, in a conventional manner, the two signals are subtracted from each other, so that one obtains the pure oscillation of the picture signal. This frequency is amplified in the amplifier V and directed to the electronic reversing switch E. This reversing switch E contains a threshold value switch, which short circuits the band elimination filter S when a certain threshold is exceeded and in this manner switches the filter circuit F off. In an appropriate manner the switching in again proceeds, delayed by an appropriate amount of time.

In order to avoid interference in the filter circuit F, a buffer element T is inserted in the line between the logarithmic element L and the electronic reversing switch E, which, however, is not necessary to understand the invention, and which therefore will not be discussed in greater detail.

Figure 5:
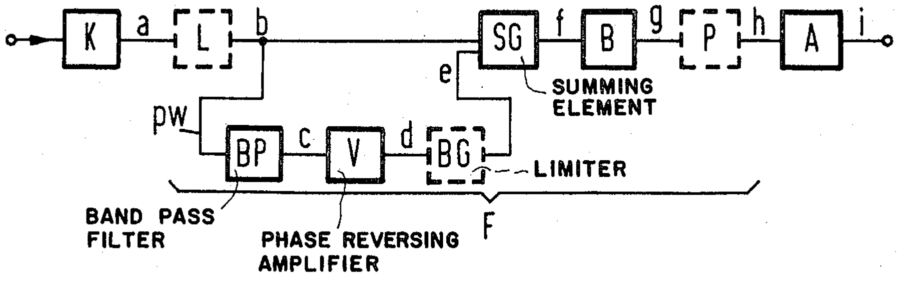
FIG. 5 is a block schematic diagram of a second alternative to the FIG. 1 embodiment.

The circuit of FIG. 5 comprises a logarithmic amplifier L, a summing element SG, a limiter B, a exponential amplifier P, as well as a parallel path pw between the logarithmic element L and the summing element SG, in which a band pass filter BP, a phase reversing amplifier V and a second limiter BG are placed.

The logarithmic element L, the exponential amplifier P and the second limiter BG are drawn in dashed line, which indicates that these elements are optional.

FIG. 6 shows how the video signal recovered from the camera is reconstituted in the individual circuit elements. The small letters identifying the individual diagrams in FIG. 6 correspond, respectively, to the similarly labelled locations in the FIG. 5 circuit.

It is also again assumed for this example, that the power interference frequency is 100 Hz, to which the band pass filter BP is tuned.

Figure 6A:
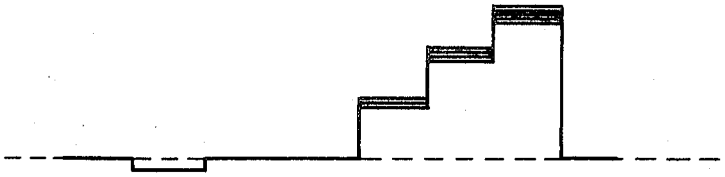

In the input of the compensation filter, the clamping circuit K provides for the fact that the picture signals are clamped to the black value in the gating gap. At the output of the clamping circuit, for example, during several frame changes, a line picture signal is present, as shown in FIG. 6a. The curve is composed therefore of several picture signals taken from the same line, by which, however, the subject of the picture is exposed to an illumination fluctuation dependent on the power frequency. Whereas, the black value appears as a sharp straight line in FIG. 6*a*, the gray values and the white value consist of several superimposed lines.

Figure 6B:
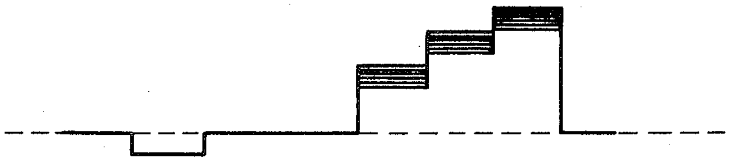

In the succeeding logarithmic amplifier L the logarithm of the picture signal is formed, so that a curve in accordance with FIG. 6b from the same picture line is present at point b in the circuit.

From the output of the logarithmic element L, the signal arrives directly at the summing element SG, and it is also diverted to the band pass filter BP. This band pass filter, tuned to 100 Hz, should be as selective as possible, in order to hold to a minimum the undesired responses due to the 60 Hz gating pulses of the video signal. The 100 Hz oscillation according to FIG. 6*c* which stems from the light modulation and is perceived by camera, appears at the output of the band pass filter.

A phase-reversing amplifier V is connected to the output of the band pass filter. Therein, a phase-shifting of the interference signal of 180° is undertaken, as well as the interference signal being amplified such that it is as large in the summing element SG as the interference frequency which reaches the summing element SG from the logarithmic element over a direct path. A second limiter BG, connected to the output of amplifier V, serves to prevent an overcompensation with certain movements, which themselves generate 100 Hz portions in the video signal.

Figure 6C:
Figure 6D:
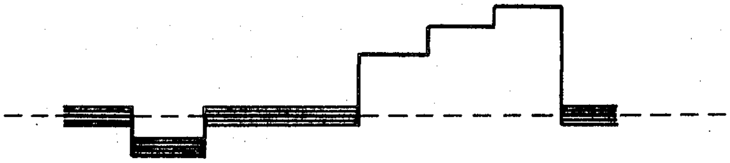
Figure 6E:
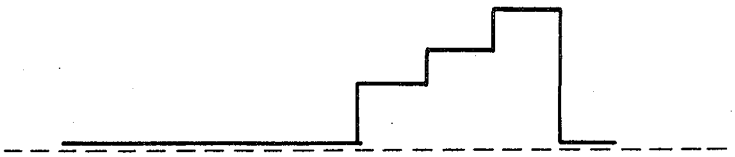
Figure 6F:
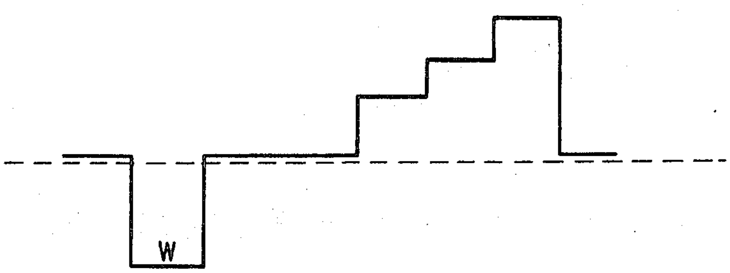

In the summing element SG, then, there occurs a summation of the pure, phase-shifted interference frequency and of the disturbed picture signal, i.e., the curves FIG. 6*b* and FIG. 6*c* are added in the known manner. At the output of the summing element SG, therefore, there is a curve according to FIG. 6*f*. Here the 100 Hz interference frequency is compensated in the picture content (gray values), but in the gating gap and on the black base line, where previously no interference oscillations were present, interference components now exist.

The following limiter B, however, removes the latter interference components, so that the picture signal in various stages of brightness in accordance with FIG. 6*h* is interference-free. Since the limiter threshold lies somewhat above the interference frequency amplitude, the darkest gray tone does not equal the original black value. This loss of information, which in most cases should be under 5 percent, is, however, so small that it can be ignored.

At this point, the antilogarithm of the video signal is derived in the potentiometer P and directed to the adder A, in which the picture gating, line gating, and synchronous pulses in the line gating gap w are added to the video signal. The signal, so recovered, thus (FIG. 6*i*) contains no more interference components stemming from the differing frame frequency and ambient lighting frequency.

FIG. 5 shows that the video signal from the summing element SG next passes through limiter B and only then through the potentiometer P. However, it is also possible to exchange the two apparatuses with each other. In addition, it is possible to unite the limiter B with the adder A such that a limiting and an adding to of the required line gating gaps — pulses takes place simultaneously.

Figure 7:
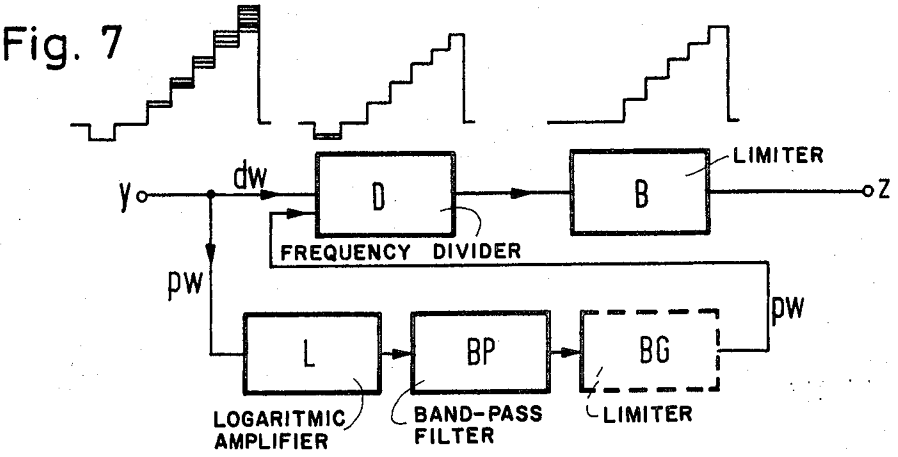
FIG. 7 is a block schematic diagram of a third alternative to the FIG. 1 embodiment along with waveform diagrams of signals appearing at various points in that circuit.

In the FIG. 7 embodiment, the clamped, disturbed video signal is directed to the illustrated circuit arrangement over an input *y*. This signal has, for example, the form such as may be seen in the diagram immediately above the input line. The curve is composed of several picture signals taken from the same line, whereby, however, the subject of the picture is exposed to an illumination fluctuation dependent on the power frequency. Whereas, the black value is picked up as a sharp straight line, the gray values and the white value consist of several superimposed lines.

This picture signal arrives over a direct path dw at one of two inputs to a conventional frequency divider D. Simultaneously, however, it also reaches a logarithmic amplifier L along a parallel path *pw*. In this logarithmic element the video signal is kept proportional to the relative light fluctuation and constant, independent of the respective picture amplitude.

From the logarithmic element L, the signal proceeds to a band pass filter BP. Under the assumption, that the power frequency is 50 Hz, a brightness fluctuation of 100 Hz (interference frequency) arises, to which the band pass filter BP is tuned. The 100 Hz oscillation filtered out from this band pass filter is directed to the second input of the divider D with an amplitude corresponding to the interference frequency portion of the disturbed video signal.

In an optional arrangement another limiter BG can be inserted after the band pass filter BP, which limiter prevents an overcompensation when there are genuine 100 Hz oscillations present, which come from movements in the picture.

In the divider D the disturbed picture signal is transformed through division of the two signals, as shown in the curve immediately above the divider D. As may there be seen, the fluctuations appear only in the line gating gap.

A limiter B is attached to the divider output and this limiter removes the line gating gap, as shown in the curve drawn immediately above the limiter B.

Thereafter, the refined signal is available at the output z for the pulse mixing, i.e. The line gating gap, as well as the signals necessary to control the receiver are again added thereto.

Figure 8:
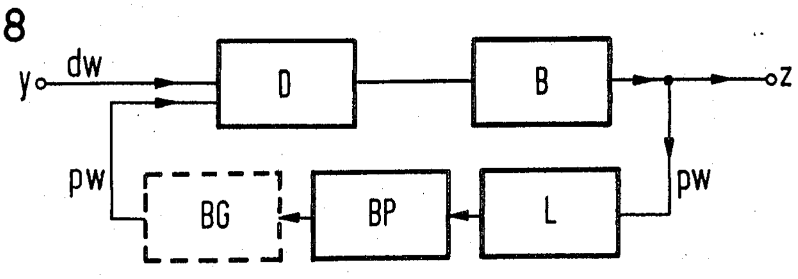
FIG. 8 is a block schematic diagram of an alternative to the FIG. 7 embodiment.

The same functional elements are provided in FIG. 8 as in FIG. 7. Here, however, the disturbed picture signal is not taken from the input y, but from the output of the limiter B or at output *z*. This signal is again directed to the second input of the divider over a logarithmic element L, a band pass filter BP and, if necessary, a limiter BG. This parallel path is constructed here, however, as a regulating circuit. That is, this circuit operates to insert that an interference frequency still present at the output *z* reduces or increases, as appropriate, the amplitude of the interference frequency which is to be mixed over the second input of the divider, until the output signal is interference free.

Figure 9:
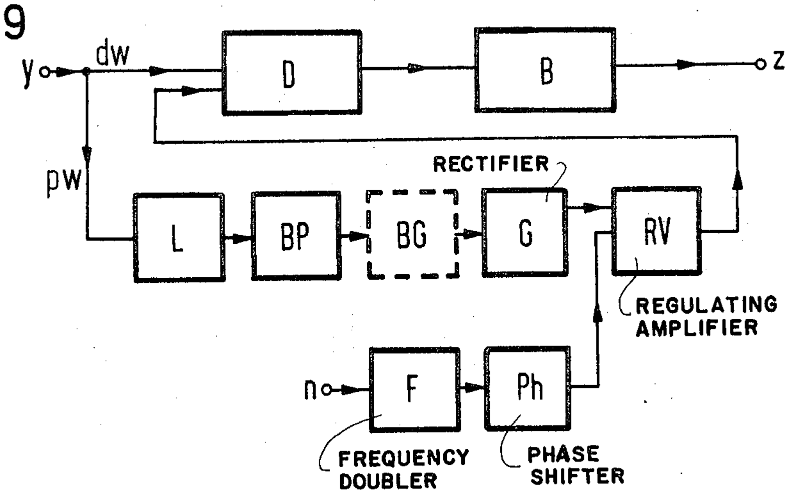
FIG. 9 is a block schematic diagram of a second alternative to the FIG. 7 embodiment.

The circuit arrangement according to FIG. 9 is similar to that of FIG. 7 in construction. A regulatory potential, which controls the amplification factor of a regulatory amplifier RV, is recovered over the logarithmic amplifier L, the band pass filter BP, a limiter BG (if necessary), and a rectifier stage G, which brings the previously recovered interference frequency to its peak or mean value.

Simultaneously, the power frequency, 50 Hz, arrives over an input n to a frequency doubler F, at the output of which the pure interference frequency is available for further processing. This frequency can, however, not be added to the divider directly, because the light current of a fluorescent lamp has, in general a phase shift of about 60° with respect to the power line phase. For this reason a phase shifter Ph is present, which shifts the interference frequency in its phase so far that it can be directed to the second input of the divider D, after an appropriate amplification in the regulatory amplifier RV.

Since in this circuit, the pure interference frequency, which is mixed with the video signal, does not pass through the parallel path pw, and the switching elements contained therein, it can also not be distorted by the band pass filter and the other elements. Consequently, no high demands need be made of these elements with respect to the phase constancy.

Figure 10:
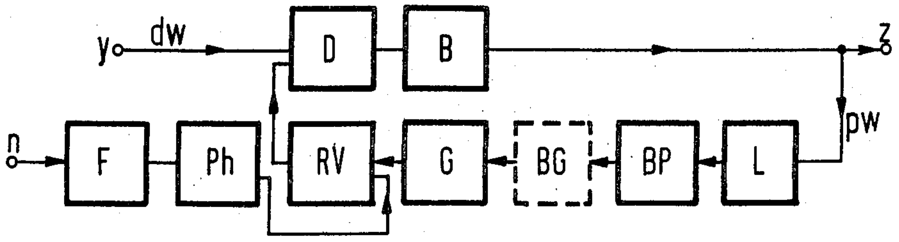
FIG. 10 is a block schematic diagram of a modified form of the FIG. 9 embodiment.

The circuit arrangement of FIG. 9 is shown in FIG. 10, in modified form. However, here again, as described in FIG. 8, the disturbed video signal is taken from the output *z*, and the interference frequency is used to control the regulatory amplifier RV. In this manner, the amplitude of the pure interference frequency is also brought automatically in the regulatory amplifier to an amplitude necessary to compensate the interference frequency.

In the FIGS. 4 to 10, described above, it is shown that the disturbed video signal is tapped off from an electrical path for the parallel path pw. But, it is also possible to derive this signal from an optical path, as shown in FIGS. 11 and 12.

Figure 11:
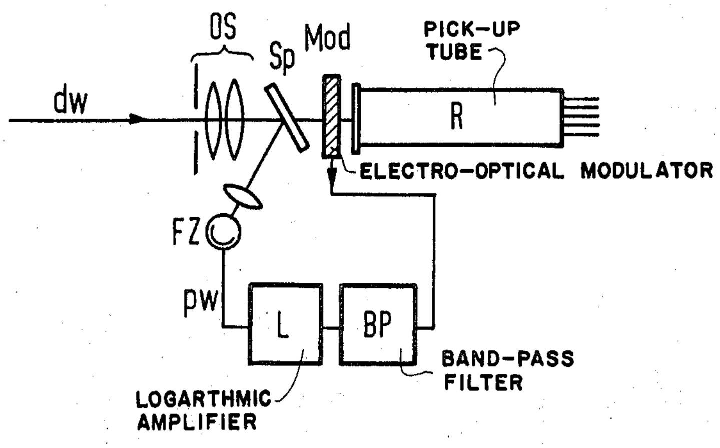
FIG. 11 is a schematic diagram of a modified form of the FIGS. 4 – 10 embodiments in which the disturbed video signal is branched to a parallel path optically, rather than electrically and, FIG. 12 is a schematic diagram of a modified form of the FIG. 11 embodiment.

As illustrated in FIG. 11, the modulated light arrives from the left over an optical system OS, to impinge on a pick-up tube R. Between the optical system OS and the tube R there is a half-silvered, mirror SP, placed at an angle, which diverts a portion of the modulated light, if necessary, over a further optical system to a photocell FZ. This photocell changes the light fluctuations into electrical oscillations, which as already described, are directed to an electro-optical modulator Mod over a logarithmic amplifier L, a band-pass filter BP, and, if necessary, other functional elements. This modulator is inserted between mirror Sp and the tube R into the path of the rays and assumes there the function of the divider. Its translucency is controlled electrically such that the brightness fluctuations are compensated and an interference-free optical signal arrives at the pick-up R.

If the position of the translucent mirror Sp is exchanged with the modulator Mod, a regulatory circuit arises, as described in FIGS. 8 and 10.

Figure 12:
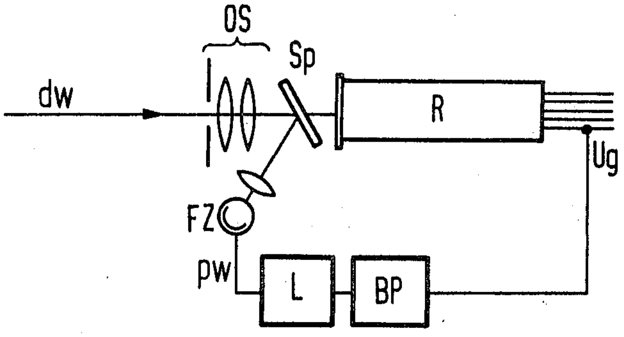

Instead of the relatively expensive electro-optical modulator Mod, a control grid of the tube R, according to FIG. 12, can be used. The pure interference frequency present at the output of the band pass filter BP, is directed as grid potential Ug, to the control grid of the tube R.

FIGS. 7 and 9 can also be modified such that the disturbed video signal, as described, arrives in the parallel path pw on an optical path; then, however, the pure interference frequency is directed to the second input of the divider electrically. Such a circuit arrangement is especially advantageous, because the optical signal contains no scanning frequencies, as yet, and they therefore do not need to be taken into account.

The invention has been described herein for use with video-telephones. It can, however, be installed with the same success in commercial television should a camera having an image receiving tube with short storage time be used, and should the illumination is done with lamps with large modulation depth, for example with fluorescent lamps.

The various preferred embodiments described hereinabove are intended only to be exemplary of the principles of the invention and not definitive of the scope of the invention. The scope of the invention is defined by the appended claims, and it is contemplated that changes to and modifications of the preferred embodiments will be within the scope of the claims.

I claim:

1. Apparatus for use in video signal transmission circuitry for eliminating interference resulting from a frame frequency different from the frequency of the light illuminating the subject photographed comprising:
means for clamping the camera output signal to the black signal level,
filter means for removing the interference frequency resulting from said illumination frequency and
adder means for adding to the filter signal picture gating, line gating, synchronizing and other signals necessary for facilitating the reproduction of a picture at a receiver,
said filter means comprising:
logarithmic amplifier means for receiving said clamped signal and producing the logarithmic equivalent of said clamp signal,
band-elimination filter means tuned to a frequency twice the value of the illuminating light frequency, said logarithmic signal being applied to said filter,
limiter means coupled to the output of said band elimination filter and
potential adjusting means for receiving the output of said limiter and producing the antilogarithm thereof, the output of said potential adjusting means being coupled to said adder means.

2. The apparatus defined in claim 1, further comprising:
comparison means for receiving the outputs of said logarithmic amplifier and said band-elimination filter and for producing a signal corresponding to the difference between the values of said logarithmic amplifier output signal and said band-elimination filter output signal, and
electronic switch means, which, when rendered operative, renders said band-elimination filter inoperative, said electronic switch means being rendered operative upon receiving a signal of a predetermined amplitude, the output of said comparison means being applied to said electronic switch means,
said predetermined amplitude being an amplitude greater than the amplitude of said interference frequency.

3. The apparatus defined in claim 2, wherein said electronic switch, includes means for short circuiting said band-elimination filter when said electronic switch is rendered operative.

4. The apparatus defined in claim 1 wherein said limiter includes means for adjusting the threshold of operation of said limiter to a value which is above a signal level corresponding to said black signal level by an amount which is at least equal to the value of the amplitude of a half wave.

5. The apparatus defined in claim 1, wherein said filter means comprises:
band-pass filter means tuned to the interference frequency and connected to receive the camera output signal,
phase reversing amplifier means connected to receive the output of said band-pass filter,
summing means having two inputs, the first of said inputs being connected to the output of said phase reversing amplifier and the second of said inputs being connected to directly receive the camera output signal, and
limiter means connected to receive the output of said summing means, the output of said limiter means being connected to said adder means.

6. The apparatus defined in claim 5, further comprising:
logarithmic amplifier means having an input connected to the output of said clamping means and an output connected to the input of said band pass filter means tuned to the interference frequency, said logarithmic amplifier having an additional output connected to an input of said summing means and,
potential adjusting means connected to an output of said limiter means and an input of said adder means for producing the antilogarithm of the signal passing therethrough.

7. The apparatus defined in claim 5, wherein said means is constructed as a frequency divider for adding the pure interference frequency signal and the camera output signal.

8. The apparatus defined in claim 7, wherein the input of said band pass filter is connected to an output of said limiter means and wherein the output of said band pass filter is connected to an input of said frequency divider means constituting said summing means.

9. The apparatus defined in claim 5, further comprising:

regulating amplifier means for controlling the amplitude of a signal applied thereto, said regulating amplifier being interposed between the output of said band-pass filter means and the first input to said summing means for controlling the amplitude of the interference frequency, means for supplying a potential to said regulating amplifier for controlling the amplification factor thereof, said regulating potential being the output of said band-pass filter and means for connecting a signal of the power line frequency directly to said regulating amplifier to be amplified therein.

10. The apparatus defined in claim 9, further comprising:

phase shifting means interposed in said means for coupling the power line frequency to said regulating amplifier to adjust the phase thereof, relative to the interference frequency contained in the camera output signal.

* * * * *